(12) United States Patent
Meyer (10) Patent No.: US 7,305,153 B2
(45) Date of Patent: Dec. 4, 2007

(54) MULTI WAVELENGTH SENSOR ARRAY

(75) Inventor: A. Douglas Meyer, Woodland Hills, CA (US)

(73) Assignee: Litton Systems, Inc., Los Angeles, CA (US)

( * ) Notice: Subject to any disclaimer, the term of this patent is extended or adjusted under 35 U.S.C. 154(b) by 33 days.

(21) Appl. No.: 11/158,110

(22) Filed: Jun. 21, 2005

(65) Prior Publication Data
US 2006/0285788 A1 Dec. 21, 2006

(51) Int. Cl.
*G01B 9/02* (2006.01)
*G02B 6/00* (2006.01)
(52) U.S. Cl. .......................... 385/12; 356/478
(58) Field of Classification Search ............... 385/12; 356/478
See application file for complete search history.

(56) References Cited

U.S. PATENT DOCUMENTS

| | | | |
|---|---|---|---|
| 4,697,926 A | 10/1987 | Youngquist et al. | |
| 5,039,221 A | 8/1991 | Layton et al. | |
| 5,696,857 A * | 12/1997 | Frederick | 385/12 |
| 2002/0057866 A1 * | 5/2002 | Hung | 385/24 |
| 2003/0043697 A1 | 3/2003 | Vakoc | |

* cited by examiner

*Primary Examiner*—Sung Pak
*Assistant Examiner*—Jerry T. Rahll (57) ABSTRACT

The number of sensors that can be used by an SSA system including a single source can be increased by using a multi wavelength source to send different wavelength pulses to each of a plurality of different sensor array ladders, particularly Sagnac sensor array (SSA) ladders. More particularly, each broadband pulse from a broadband source is wavelength divided into a plurality of narrower pulses with each narrower pulse being used in a separate sensor array ladder.

14 Claims, 4 Drawing Sheets

501
converting a broadband query signal into a plurality of narrower wavelength range query signals 503
providing a separate narrower wavelength range query signal of the plurality of narrower wavelength query signals to each set of a plurality of sets of sensor arrays ladders 505
reviewing each narrower wavelength range query signal provided to a set of sensor array ladders to obtain information from the set of sensor array ladders

FIG. 5

MULTI WAVELENGTH SENSOR ARRAY

FIELD OF THE INVENTION

The present invention relates generally to fiber optic sensor arrays.

BACKGROUND OF THE INVENTION

Figure 1:
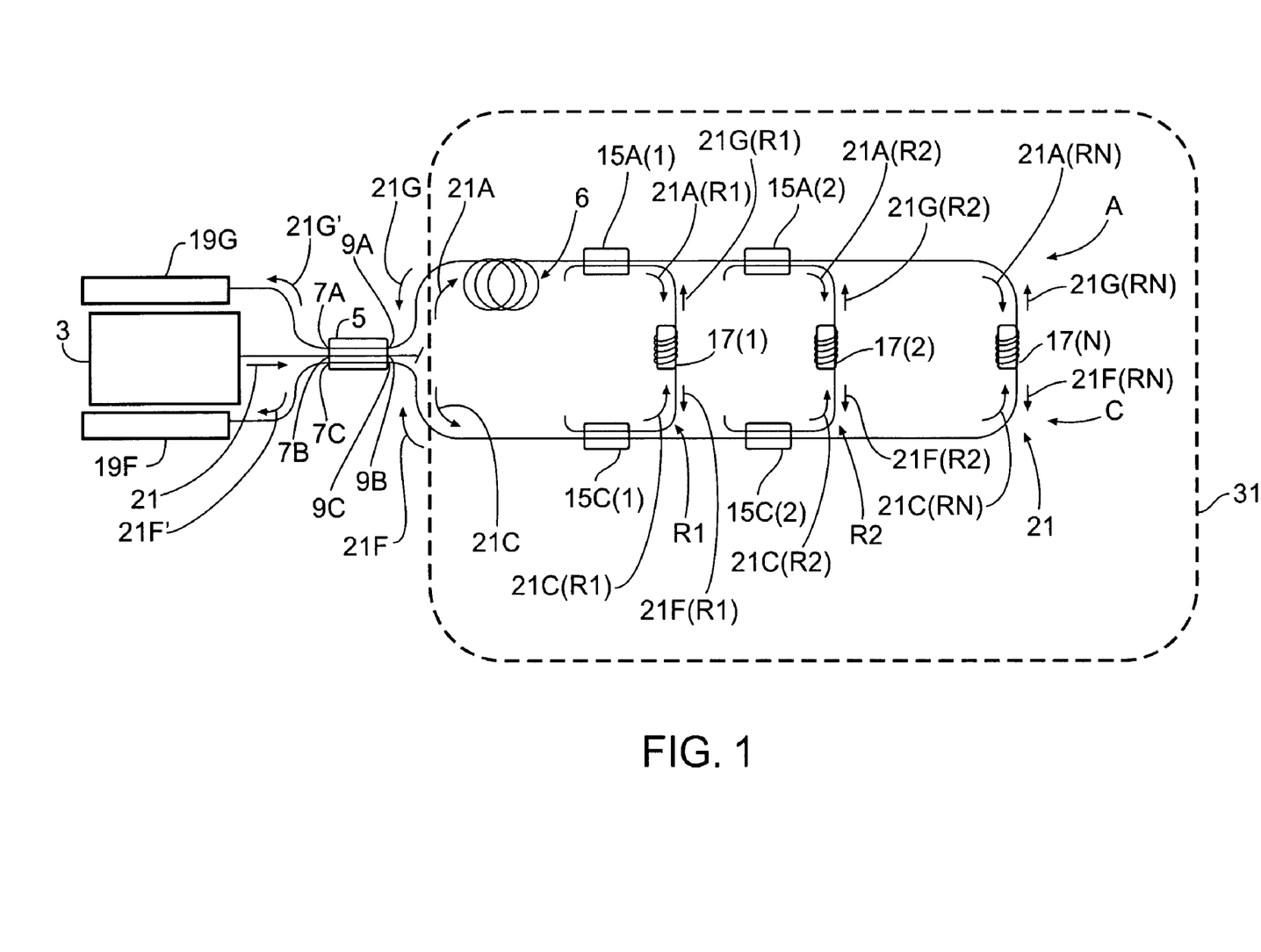
FIG. 1 is schematic view of a prior art Sagnac sensor array (SSA) system.

FIG. 1 depicts a prior art Sagnac sensor array (SSA) system 1 comprising a source 3, a coupler 5 having input ports 7A-7C and output ports 9A-9C, a clockwise distribution and agglomeration bus A, a counterclockwise distribution and agglomeration bus C, clockwise channel couplers 15A(1)-15A(N−1) where N−1=2, counter clockwise channel couplers 15C(1)-15C(N−1) where N−1=2, rungs R1-RN, sensors 17(1)-17(N), and detectors 19F and 19G. Reference to the 3rd rung as the N rung is intended to show that the actual number of rungs may vary between different sensor arrays.

In the SSA system 1, a signal 21 comprising a series of pulses of light is generated by the intensity modulated source 3 coupled to the 3×3 optical coupler 5. The coupler 5 splits the signal 21 equally among the three output ports 9A, 9B, and 9C, such that each pulse of the signal 21 output by the source 3 is split into a clockwise (cw) pulse, signal 21A, traveling along bus A, and a counter clock wise (ccw) pulse, signal 21C, traveling along bus C. The cw and ccw signals 21A and 21C travel down the busses A and C until they encounter couplers 15A(1) and 15C(1) that each split off a portion of the signals 21A and 21C, and cause the split off portions to traverse the rung R1, and the non-split off portions to continue down the busses A and C. The non-split off portions continue until they reach the next set of couplers, 15A(2) and 15C(2), that each split off a portion of the signals reaching them, and cause the split off portions to traverse the rung R2. This splitting of the remaining portions of signals 21A and 21C continues on until a final rung RN is reached at which point signal 21A has been split into a plurality of signals 21A(R1)-21A(N) and signal 21C has been split into a plurality of signals 21C(R1)-31C(N). As can be seen, the busses A and C each comprise a plurality of linearly arranged channels coupled together by the couplers 15A and 15C.

When the split off portions 21A(R1)-21A(RN) and 21C(R1)-21C(RN) of the signals 21A and 21C traverse the rungs R1-RN, they are modified by sensors 17(1)-17(N) of the rungs R1-RN. As shown, the split off portions 21A(R1)-21A(RN) are designated 21F(R1)-21F(RN) after passing through the sensors 17(1)-17(N), and the split off portions 21C(R1)-21C(RN) are designated 21G(R1)-21G(RN) after passing through the sensors 17(1)-17(N). On exiting the sensors 17(1)-17(N), the signals 21F(R1)-21F(RN) are combined on bus C by the couplers 15C(1)-15C(N) to form signal 21F, and the signals 21G(R1)-21G(RN) are combined on the bus A by the couplers 15A(1)-15A(N) to form signal 21G.

Because each pulse of the signals 21A and 21C is delayed by a coil 6 (21C after it passes through the sensors to become 21G), and split between rungs, each pulse of the signals 21A and 21C becomes multiple pulses in the signals 21F and 21G with the increased number of pulses being proportional to the number of rungs R1-RN in the SSA system 1. The individual pulses in the signals 21F and 21G are independent from each other, with each pulse in signal 21F carrying sensed information obtained via a sensor in a particular sensor rung, and each pulse in signal 21G carrying sensed information obtained via a sensor in a particular sensor rung.

The signals 21F and 21G are combined in the 3×3 coupler 5. The timing of the individual pulses of the signals 21F and 21G are such that both the cw and ccw pulses corresponding to an input pulse that passed through a particular rung pass through the coupler 5 at the same time. As a result, the pulses for a particular rung interfere with each other. The resultant signals 21F' and 21G' exiting the ports 7A and 7C are detected by the detectors 19F and 19G with the detected signals being used to obtain information imparted by the sensors 17(1)-17(N).

There is a limit to the number of sensors/rungs a sensor system such as the SSA system 1 can include before running into signal to noise issues. This is due at least in part because of the need to divide the cw and ccw signals among all the sensors/rungs. Unfortunately, having a limit on the number of sensors limits the amount of area the SSA system 1 can cover. Having a limit on the number of sensors also limits the sensing capabilities of the SSA system 1.

For later discussion, the portion of the SSA system 1 to the right of coupler 5 will be referred to as the "ladder" or "SSA ladder" of the SSA system 1. As can be seen, the ladder 31 of SSA system 1 includes the pair of buses A and C, and the rungs R1-RN extending between the busses A and C, and the sensors of those rungs. The SSA ladder 31 also includes a delay coil 6. However, "ladders" and "SSA ladders", as the terms are used in the detailed description, do not necessarily include a delay coil.

SUMMARY OF THE INVENTION

The present invention is directed to increasing the number of sensors that can be used by an SSA system comprising a single source by utilizing a multi wavelength source to send different wavelength pulses to each of a plurality of different sensor array ladders, particularly Sagnac sensor array (SSA) ladders. More particularly, each broadband pulse from a broadband source is wavelength divided into a plurality of narrower pulses with each narrower pulse being used in a separate sensor array ladder.

In a first exemplary embodiment, the present invention is a sensor array system comprising a signal source providing a query signal, a plurality of sensor array ladders, and a mechanism routing a first frequency slice of the query signal to a first array of the plurality of sensor arrays, and routing a second frequency slice of the query signal to a second array of the plurality of sensor arrays. The first and second frequency slices are frequency separated.

In a second exemplary embodiment, the present invention is a sensor array system comprising: a broadband source; a plurality of sensor array ladders; and a wavelength division multiplexer optically coupled between the broadband source and the plurality of sensor array ladders; where the wavelength division multiplexer receives a broadband signal from the broadband source, and splits the broadband signal into a plurality of non-overlapping signals that are each narrower than the broadband signal.

In a third exemplary embodiment, the present invention is a method of obtaining information from a plurality of sensor array ladders comprising: converting a broadband query signal into a plurality of narrower wavelength range query signals; providing a separate narrower wavelength range query signal of the plurality of narrower wavelength query signals to each set of a plurality of sets of sensor arrays ladders; and reviewing each narrower wavelength range query signal provided to a set of sensor array ladders to obtain information from the set of sensor array ladders.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims.

In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

The number of sensors that a Sagnac sensor array system can have can be increased by utilizing a plurality narrow band or single wavelength pulses to query a plurality of SSA ladders. By using a plurality of ladders, the number of sensors that can be used is multiplied by the number of ladders used. Increasing the number of sensors in such a manner facilitates covering larger areas with a single system. Increasing the number of sensors also improves signal to noise ratio when forming array beams and performing signal processing. It also adds a level for robustness by decreasing potential single points of failure.

Figure 2:
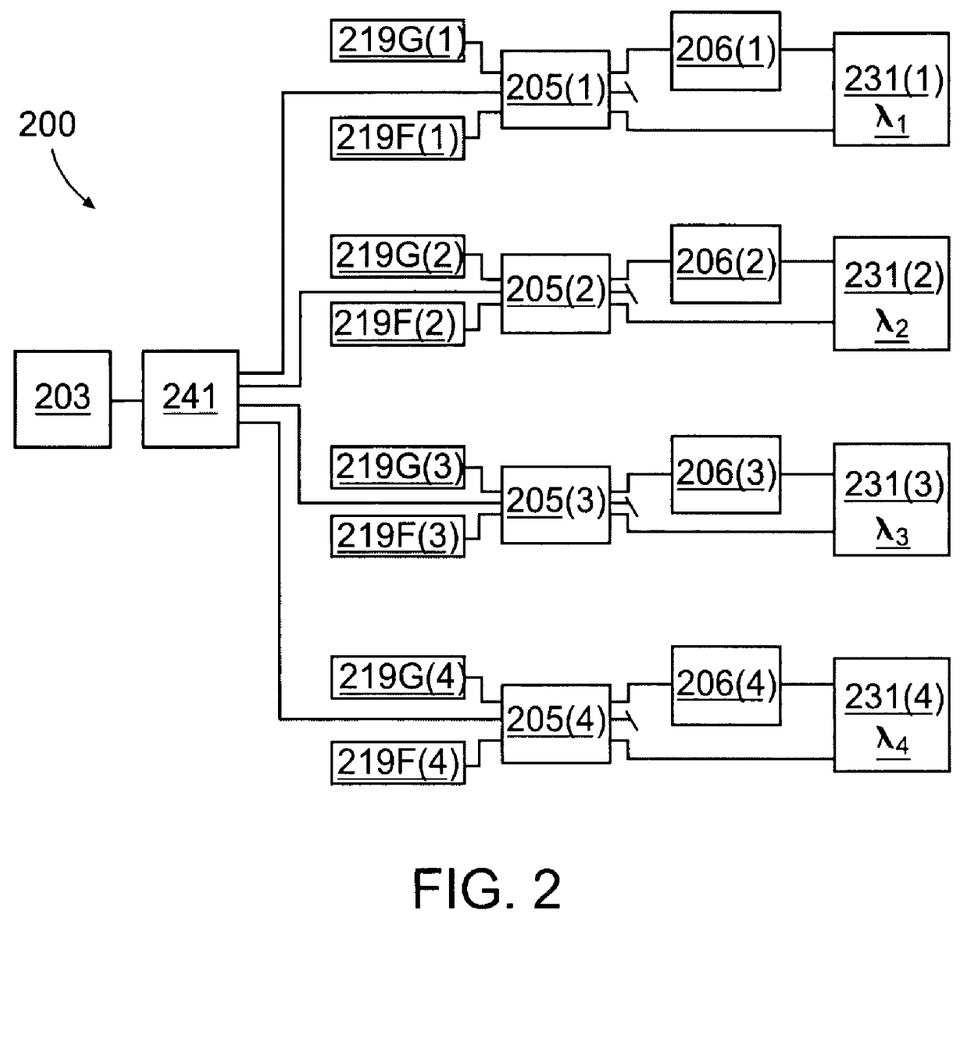
FIG. 2 is a schematic view of an SSA system in accordance with an exemplary embodiment of the invention.

In FIG. 2, a Sagnac sensor array (SSA) system 200 includes an intensity modulated source 203, a wavelength division multiplexer/demultiplexer (WDM) 241, detectors 219F(1) and 219G(1), detectors 219F(2) and 219G(2), detectors 219F(3) and 219G(3), detectors 219F(4) and 219G(4), couplers 205(1), 205(2), 205(3) and 205(4), delay loops 206(1), 206(2), 206(3) and 206(4), and SSA ladders 231(1), 231(2), 231(3), and 231(4). The source 203 provides a series of pulses used to query the SSA ladders 231(1)-231(4). To a certain extent, the system 200 can be viewed as a plurality of single ladder sensor array systems driven by a common source 203. The output of the source 203 is a series of pulses. The WDM 241 partitions the pulses from the source 203 into a set of narrower pulses having non-overlapping frequency spectrums. Each narrower pulse is then used to query a SSA ladder 231(1)-231(4).

The source 203 may advantageously comprise an SLD. In some such instances, the SLD may be characterized as having an optical bandwidth of 30 to 60 nanometers at full width half maximum (FWHM), and having a wavelength spectral distribution that is at least somewhat lambertian or gaussian in shape. Such a source may have a wavelength centroid near 1550 nanometers, or have a centroid in the 800 and 1300 nm wavelength window. The optical power from such a source may be in the range of 10-100 milliwatts, but is preferred to have the highest output power for the particular wavelength band of interest so as to maximize the output power in the partitioned wavelengths. In some instances, a thermal electric cooler (TEC) may be used in conjunction with the SLD source so as to 1) eliminate or minimize thermally induced wavelength drift, 2) allow for a broader environmental operating temperature range of the SLD and, 3) increase the operational lifetime of the SLD.

In some instances the source 203 may be an optical fiber based amplified spontaneous emission (ASE) source. Such a source is typically made from a length of doped optical fiber that is pumped by a pumping wavelength causing the doped fiber to generate a broadband fluorescence in a free run condition. The wavelength of ASE or fluorescent emission is a function of the dopant ions used. Erbium ($ER^{+3}$) is one of the better known dopant ions from its wide spread use in the optical amplifier, and produces an ASE spectrum in the 1550 nm window. Fibers can be doped with other ions that can laser. As an example, a fiber doped with praseodymium ($Pr^{+3}$) will produce an ASE spectrum in the 1300 nm window. The spectral width of the ASE source is governed by the emission properties of the dopant, and the optical power level is governed by the dopant concentration, the power of the pumping source, and any internal losses in the ASE system. For the $ER^{+3}$ case, the spectral width is ~30 nm and the power levels can be in the range of 10's of milliwatts.

The WDM 241 may be a device using a plurality of fiber Bragg gratings to convert each pulse of an incoming signal into a plurality of narrower, spectrally separated pulses. In other instances the WDM 241 may be comprised of multiple thin film optical filters. These thin film filters are produced by depositing a stack of dielelctric coating material on top of a fused quarts substrate. Depending on how the stack is designed, specific wavelengths can be transmitted through or reflected off of the filter element. These devices can be made with a fair amount of precision and tolerance to produce devices having optical loss and optical passband properties so as to provide the appropriate wavelength slicing of the optical source 203. The telecommunications industry uses a form of these filters as part of WDM transmission systems and they have proven to be robust over a temperature range of 40° C. to +85° C. The use of either the fiber Bragg grating or thin film filter type is the preferred choice due to their performance, availability, and cost. Another candidate for filter type for use in this application is a Fabray-Perot filter. This type of optical filter use two parallel plates of fused silica to form a cavity, the spacing between the plates can be adjusted such that the cavity length is tuned (over a limited) range to allow the transmission of the desired wavelength. While the F-P filter can tune to wavelength very precisely, the shape of the sliced wavelength and its stability is not ideally suited to this application, additionally the cost of these devices are considerably higher than the other two options.

It is contemplated that the multi-wavelength optical source described in the inventor's co-pending application titled "Multi-Wavelength Optical Source" may advantageously be used as the source 203, said application being hereby incorporated by reference in its entirety. More particularly, the multi-wavelength optical source ("MWOS") proposed in the co-pending application has the ideal functionality for the array architecture proposed in this application. Additionally, as described in the co-pending application the multi-wavelength optical source is capable of delivering the appropriate sliced wavelengths that can be used by any of the proposed embodiments of the SSA.

Each SSA ladder of the ladders 231(1)-231(4) can comprise any sensor system that utilizes counter-propagating pulses. However, it is contemplated that each SSA ladder may advantageously comprise a plurality of couplers and sensors and a delay coil configured as shown in regard to the ladder 31 of FIG. 1. It is contemplated that in some instances such couplers may comprise devices that tap (couple) off only a portion of the optical signal traveling down the telemetry ladder. The preferred coupler for this application is of the fused fiber variety as it is readily available and environmentally robust. Alternate approaches to the fused fiber coupler would be; 1) polished fiber 2) micro-optic coupler, devices which utilize miniature beams splitters and GRIN (graded index) rod lenses, or 2) waveguide devices made from either polymers or organic crystals. In both of the latter cases optical fiber leads are pigtailed to be used as the input and output of the device and for ease of integration into optical fiber systems. The couplers used in the ladder will have tiered coupling ratios so as to partition the optical signal equally among all the sensors. For example, in a ladder containing eight optical sensors the ideal tap ratios for the couplers are; 12.5%, 14.3%, 16.7%, 20.0%, 25.0%, 33.3%, and 50%. The tap ratio of each coupler is position dependent, in the example the 12.5% is the first coupler and the 50% coupler is the last one in the telemetry chain, as referenced from the optical input signal. This type of tiered telemetry approach has proven to be effective in sensor system applications where multiple sensors are used along a telemetry bus. The values used in the example are for ideal tap couplers and assumes that they are manufactured precisely. Couplers available for purchase have a target coupling ratio that has an upper and lower bound associated with it. Typically, the bounded values are within 2% to 5% of the targeted value. For example the coupler may have a target coupling value of 22% with the specifications bounds of ±2% means the delivered coupler will have a coupling ratio between 20% and 24%. A higher tolerance can be obtained but the price of these devices will increase dramatically without a significant realization in performance benefit. With the knowledge that coupling ratios fall within a tolerance band, the ideal couplers cited in the example can be reduced to a few values thereby making the telemetry more cost effective due to the increase volume of specific couplers. In the example case the values would change to; 15%, 15%, 15%, 22%, 22%, 33%, and 50%. As can be seen there has been a 40% reduction in the number of different coupling ratios required. It is also contemplated that the sensors used in this architecture can be of the following types; hydrophone (both omni-directional and directional), velocity (or displacement), magnetic field, and electric field. It should also be noted the at any combination of these sensor types may be deployed as part of the a SSA ladder without a loss in function or generality of the overall array architecture.

The couplers 205(1)-205(4) are preferably 3×3 couplers as are often used in SSA systems. In some instances it may be advantageous if one or more of the couplers 205(1)-205(4) are comprised of a fused fiber coupler. This device is fabricated in a similar fashion as the tap coupler discussed above. In the ideal device the output is split uniformly between each of the three outputs of the device, and therefore carry one third of the original input power on each output leg. The ideal coupling ratio is 33% (4.8 dB), however as noted in the above discussion the coupling ratio of produced devices have an upper and lower performance band. In this case the insertion loss requirement is 5.6 dB maximum with a coupling uniformity value of less than or equal to 1.0 dB. Insertion loss is defined as the ideal coupling ratio plus any internal excess loss of the device. The uniformity is defined as the maximum output difference between any one of the adjacent output legs and is referenced to the input optical power.

Each coupler 205(1)-205(4) functions in a similar manner to the coupler 5 of system 1. As such, each coupler 205(1)-205(4) splits a signal from the source 203 equally, such that each pulse of the input signal output by the source 203 is split into a clockwise (cw) pulse and a counter clock wise (ccw) pulse provided to the SSA ladder coupled to the coupler. Moreover, as each pair of counter-propagating pulses returns from the SSA ladder, they pass through the coupler so as to interfere with each other with the resultant signals being fed to a pair of the detectors 219F(1)-219F(4) and 219G(1)-219G(4).

The detectors 219F(1)-219F(4) and 219G(1)-219G(4) may be any optical sensor that is capable of converting optical energy into electrical current and allows for proper detection of the signals exiting the couplers 205(1)-205(4). Any optical sensor (photodetector) used is preferably capable of following a time varying optical signal and converting it to a time varying current that is a faithful reproduction of the detected optical signal. This is preferably be done with minimal signal distortion and noise generation. The photodetectors used in this application can be either be a simple nonamplifying producing a simple photocurrent as a result of the impinging optical signal, or the device may have an integrated transimpedance amplifier to amplify the photocurrent prior to further signal processing. In either case the appropriate photodetector base materials must be chosen correctly for the optical wavelength window in which the SSA is to operate. The optically responsively of the detector is important in is selection for use, for SSA operation in the near infrared region ~850 nanometers silicon (Si) is commonly chosen as the photosensitive material. A host of materials are available for detectors in the 1300-1550 nanometer (as well as the greater than or equal to 1000 nanometer) wavelength region, such as germanium (Ge), indium-gallium-arsenide (InGaAs), indium-gallium-arsenide-phosphide (InGaAsP). Detectors made from Si typically have a responsivity value of 0.55 to 0.6 amperes per Watt (A/W) at 850 nm, while InGaAs and InGaAsP detectors have responsivities of approximately 0.7 A/W and approximately 0.85 A/W for 1310 and 1550 nm, respectively.

In one embodiment, the intensity modulated source 203 may be a broadband optical source producing a signal approximately 30 nm in width, and the WDM 241 may partition the broadband signal from the source 203 into four sub-signals/slices at are each approximately 7.5 nm in width, or, if 2 nm guard bands are desired, approximately 5.5 nm in width.

It is important to note that although the figures and description focus primarily on systems having four SSA ladders, the actual number of SSA ladders can vary between embodiments. If the number of ladders increases, the number of slices produced by the WDM 241 will increase accordingly. In a prior art SSA that does not utilize the wavelength slicing technique, only one ladder may be formed using a single optical signal source, therefore increasing the number of ladders would necessitate increasing the number of sources required on a one-to-one basis. In wavelength slicing more ladders can be driven by a single wavelength source, the number of ladders is dependent on the number of wavelengths that are sliced form the broadband spectral source. It follows that the broader the bandwidth of the spectral source the more wavelengths can be sliced from it. Another point that must be considered is the number of sensors and rungs per ladder. Here considerations must be given to the overall system requirements such as, noise floor, minimum detectable signal, and dynamic range. The amount of optical signal that is returned to the photodetector influences these values. This must be considered when comparing a wavelength sliced system to a non-sliced system. When using wavelength slicing the total optical power available in each sliced wavelength is less than that in the original unsliced signal, therefore there maybe less sensor per ladder when compared to a non-sliced system, but with the increase in number of ladders, a net gain in the overall sensor per system can be realized.

To further increase the number of sensor per ladder, an optical amplifier can be used after the wavelengths have been sliced. The amplifier will increase the amount of power available in each of the wavelength slices therefore allowing for more sensors per ladder. The important figure of merit in the SSA is the number of sensors per optical source, the larger this number the more efficient the system will be in terms of wavelength and optical power utilization will be.

Figure 3:
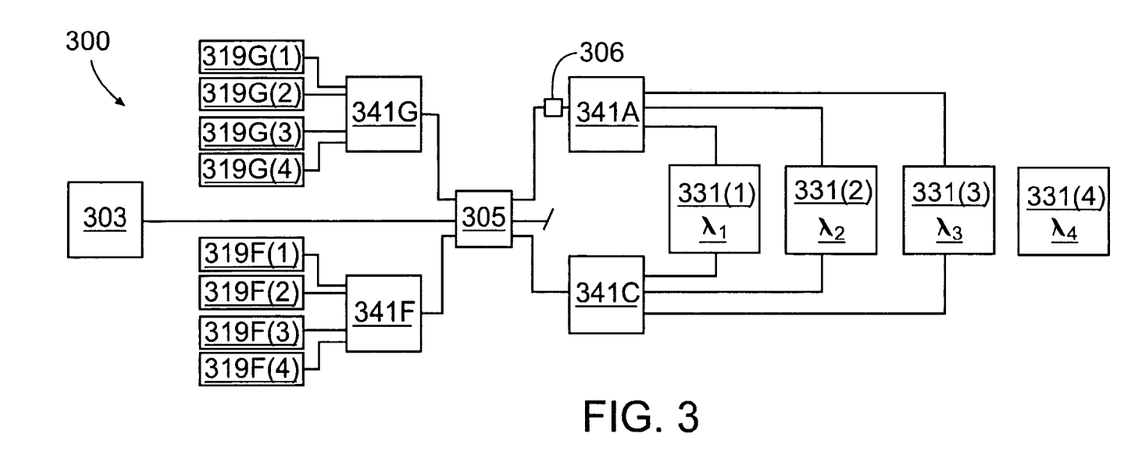
FIG. 3 is a schematic view of another SSA system in accordance with an exemplary embodiment of the invention.

In FIG. 3, a SSA system 300 includes an intensity modulated source 303, WDMs 341A, 341C, 341F and 341G, photo detectors 319F(1)-319F(4), photo detectors 319G(1)-319G(4), a coupler 305, a delay loop 306, and SSA ladders 331(1)-331(4). The system 300 differs from the system 200 in that a single 3×3 coupler 305 and a single delay coil 306 are used to provide counter propagating cw and ccw pulses to all of the SSA ladders 331(1)-331(4). This is accomplished by inserting the WDM 341A between the delay coil 306 and the ladders 331(1)-331(4), the WDM 341C between the coupler 305 and the ladders 331(1)-331(4), the WDM 341G between the coupler 305 and the detectors 319G(1)-319G(4), and the WDM 341F between the coupler 305 and the detectors 319F(1)-319F(4). As a result, each pulse from the source 303 is frequency sliced by the WDMs 341A and 341C to provide pulses that are narrower and spectrally non-overlapping to the ladders 331(1)-331(4). On passing back through the WDMs 341A and 341C, the pulses are merged into a common waveguide, pass through the coupler 305 (and with some, the delay coil 306) to the WDMs 341F and 341G. The WDMs 341F and 341G separate the pulses and feed the narrow/individual wavelength pulses to the detectors 319G(1)-319G(4) and 319F(1)-319F(4).

The use of a single delay coil for a plurality of SSA ladders provides a substantial advantage. Each such coil could be tens of kilometers in length and reducing the number of coils significantly reduces the amount of optical fibers or other waveguides required.

Figure 4:
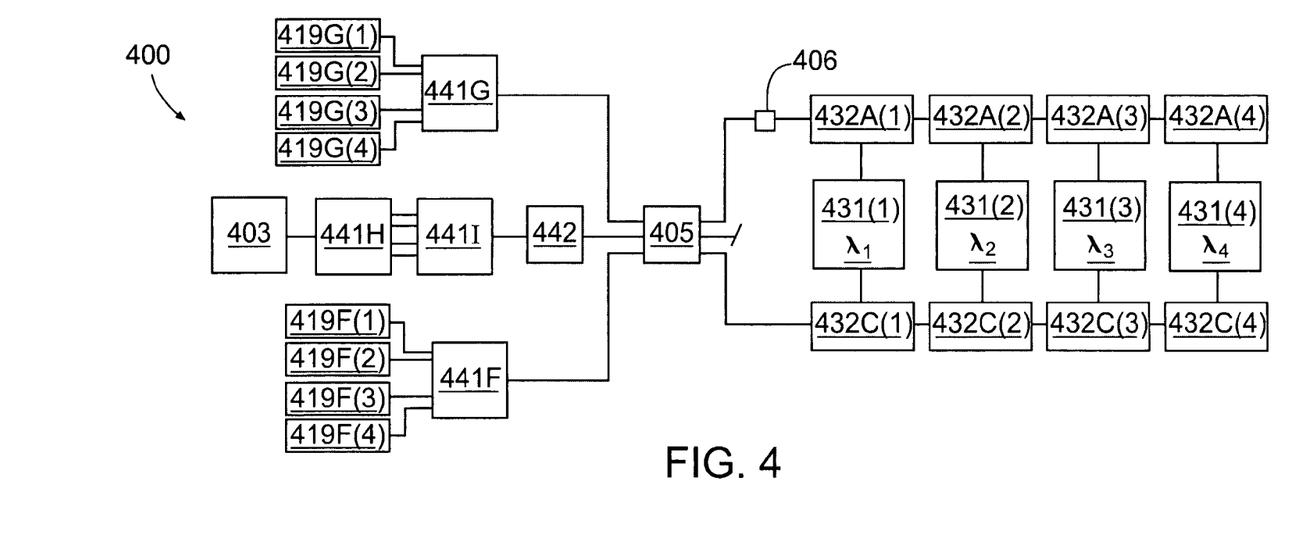
FIG. 4 is a schematic view of yet another SSA system in accordance with an exemplary embodiment of the invention.

In FIG. 4, an SSA system 400 includes an intensity modulated source 403, WDMs 441H, 441I, 441F and 441G, photo detectors 419F(1)-419F(4), photo detectors 419G(1)-419G(4), a coupler 405, a delay loop 406, WDM Add/Drop modules 432A(1)-432A(4) and 432C(1)-432C(4), and SSA ladders 431(1)-431(4).

The system 400 differs from the system 300 in that it incorporates the pair of WDMs 441H and 441I, optionally includes an optical amplifier 442 before the coupler 405, and utilizes a series of WDM Add/Drop modules 432A(1)-432A(4) and 432C(1)-432C(4) in place of the WDMs 341A and 341C of system 300 of FIG. 3. The modules 432A(1)-432A(4) and 432C(1)-432C(4) are used to split off or add back narrow band pulses from the cw and ccw signals to deliver them from or to the A and C busses of the SSA ladders 431(1)-431(4). This arrangement, although requiring an increased number of WDMs, can be used to cut down on the amount of optical fiber required to send signals to and from the individual SSA ladders 431(1)-431(4).

It is contemplated that positioning an optical amplifier as shown in FIG. 4 is advantageous as amplification occurs on the source side/branch of the coupler, and there is no need to worry about bi-directional signals as seen between the coupler 405 and the ladders 431(1)-431(4).

The benefit of using the mux/demux pair 441H and 441I over other embodiments described in this application is the optical source signal from 403 is preconditioned (e.g., wavelength sliced) prior to input into the 3×3 coupler 405. This puts the wavelength slicing function exterior to the sensor ladders, making it simpler to optically amplify the sliced wavelengths should this be required.

The WDM Add/Drop modules may comprise elements capable of either adding or dropping a single specific wavelength from a composite signal containing multiple wavelengths. Further the Add/Drop module should be able to pass (or express) through the wavelengths that are not dropped with little or no degradation in their performance. Conversely, when a wavelength is added to the express wavelengths there should be no or little degradation in the added or express wavelengths. Passive Add/Drop modules can be composed of either thin film filter or fiber Bragg grating elements, for the purposes of this application it is treated as a black box and the specific details of its mechanization are omitted. Typical performance for these devices insertion loss for express wavelengths less than or equal to 0.8 dB, insertion loss for add/drop wavelength less than or equal to 1.0 dB, optical isolation between add/drop and express wavelengths greater than or equal to 25 dB.

The embodiments of the present invention described herein comprise multiple novel features with each described embodiment including either a single such feature or a combination of such features. Other contemplated embodiments include all combinations of one or more such novel features not explicitly described herein as such combinations are readily discemable from the embodiments described. In light of the various contemplated embodiments, the present invention can be characterized in a number of ways with the following paragraphs providing examples of some such characterizations.

The embodiments of the present invention shown in FIGS. 2-4 are examples of a class of embodiments that each be described as a sensor array system comprising: a broadband source; a plurality of sensor array ladders; and a wavelength division multiplexer optically coupled between the broadband source and the plurality of sensor array ladders; where the wavelength division multiplexer receives a broadband signal from the broadband source, and splits the broadband signal into a plurality of non-overlapping signals that are each narrower than the broadband signal. Referring to the embodiment shown in FIG. 2, the system 200 includes the broadband source 203, the wavelength division multiplexer 241, and the plurality of sensor array ladders 231(1)-231(4). The wavelength division multiplexer 241 receives a broadband signal from the broadband source 203, and splits the broadband signal into a plurality of non-overlapping signals that are each narrower than the broadband signal. Referring to the embodiment shown in FIG. 3, the system 300 includes the broadband source 303, the wavelength division multiplexer 341A, and the plurality of sensor array ladders 331(1)-331(4). The wavelength division multiplexer 341 receives a broadband signal from the broadband source 303, and splits the broadband signal into a plurality of non-overlapping signals that are each narrower than the broadband signal. Referring to embodiment of FIG. 4, the system 400 includes the broadband source 403, the wavelength division multiplexer 441H, and the plurality of sensor array ladders 431(1)-431(4). The wavelength division multiplexer 441H receives a broadband signal from the broadband source 303, and splits the broadband signal into a plurality of non-overlapping signals that are each narrower than the broadband signal.

The embodiments of FIGS. 2-4 are also examples of a class of embodiments where all of the plurality of sensor array ladders are Sagnac sensor array ladders. They are also examples of a class of embodiments where each sensor array ladder receives a separate signal of a plurality of non-overlapping signals. However, wavelength division multiplexers are used in the embodiments of FIGS. 2 and 3 to provides such non-overlapping signals, while the embodiment of FIG. 4 utilizes two sets of serially arranged add/drop modules to provide the non-overlapping signals.

The embodiment of FIG. 2 is also an example of a class of embodiments having a plurality of optical couplers 205(1)-205(4), and a plurality of optical detector pairs (219F(1), 219G(1))-(219F(4),219G(4)). It is also an example of a class of embodiments where each optical coupler of the plurality of optical couplers 205(1)-205(4) is optically coupled to both sides of a Sagnac sensor array ladder 231(1), 231(2), 231(3), 231(4), and is optically coupled to both optical detectors of one pair of optical detectors of the plurality of optical detector pairs (219F(1), 219G(1))-(219F(4),219G(4)).

The embodiment of FIG. 2 is also an example of a class of embodiments where: (a) the plurality of optical couplers 205(1)-205(4) comprises at least a first optical coupler 205(1), a second optical coupler 205(2), a third optical coupler 205(3), and a fourth optical coupler 205(4), and each optical coupler comprises at least six ports; (b) the plurality of Sagnac sensor array ladders 231(1)-231(4) comprises at least a first sensor array ladder 231(1), a second sensor array ladder 231(2), a third sensor array ladder 231(3), and a fourth sensor array ladder 231(4); (c) the plurality of optical detector pairs (219F(1), 219G(1))-(219F(4),219G(4)) comprises at least a first detector pair (219F(1), 219G(1)), a second detector pair (219F(2), 219G(2)), a third detector pair (219F(3), 219G(3)), and a fourth detector pair (219F(4), 219G(4)), and each of the first, second, third, and fourth detector pairs comprises a first detector (219F(1), 219F(2), 219F(3), or 219F(4)), and a second detector (219G(1), 219G(2), 219G(3), or 219G(4)); (d) the system 200 furthers comprises at least a first delay coil 206(1), a second delay coil 206(2), a third delay coil 206(3), and a fourth delay coil 206(4); (e) a first port of the first optical coupler 205(1) is optically coupled to a first port of the wavelength division multiplexer 241, a first port of the second optical coupler 205(2) is optically coupled to a second port of the wavelength division multiplexer 241, a first port of the third optical coupler 205(3) is optically coupled to a third port of the wavelength division multiplexer 241, a first port of the fourth optical coupler 205(4) is optically coupled to a fourth port of the wavelength division multiplexer 241, and the optical source 203 is optically coupled to a fifth port of the wavelength division multiplexer 241; (f) a second port of the first optical coupler 205(1) is optically coupled to a first end of the first delay coil 206(1), a second port of the second optical coupler 205(2) is optically coupled to a first end of the second delay coil 206(2), a second port of the third optical coupler 205(3) is optically coupled to a first end of the third delay coil 206(3), and a second port of the fourth optical coupler 205(4) is optically coupled to a first end of the fourth delay coil 206(4); (g) a second end of the first delay coil 206(1) is optically coupled to a first end of the first sensor array ladder 231(1), a second end of the second delay coil 206(2) is optically coupled to a first end of the second sensor array ladder 231(2), a second end of the third delay coil 206(3) is optically coupled to a first end of the third sensor array ladder 231(3), and a second end of the fourth delay coil 206(4) is optically coupled to a first end of the fourth sensor array ladder 231(4); (h) a fourth port of the first optical coupler 205(1) is optically coupled to a second end of the first sensor array ladder 231(1), a fourth port of the second optical coupler 205(2) is optically coupled to a second end of the second sensor array ladder 231(2), a fourth port of the third optical coupler 205(3) is optically coupled to a second end of the third sensor array ladder 231(3), and a fourth port of the fourth optical coupler 205(4) is optically coupled to a second end of the fourth sensor array ladder 231(4); and (i) a fifth port of the first optical coupler 205(1) is optically coupled to the first detector 219F(1) of the first detector pair and a sixth port of the first optical coupler 205(1) is optically coupled to the second detector 219G(1) of the first detector pair, a fifth port of the second optical coupler 205(2) is optically coupled to the first detector 219F(2) of the second detector pair and a sixth port of the second optical coupler 205(2) is optically coupled to the second detector of the second detector pair 219G(2), a fifth port of the third optical coupler 205(3) is optically coupled to the first detector 219F(3) of the third detector pair and a sixth port of the third optical coupler 205(3) is optically coupled to the second detector 219G(3) of the third detector pair, and a fifth port of the fourth optical coupler 205(4) is optically coupled to the first detector 219F(4) of the fourth detector pair and a sixth port of the fourth optical coupler 205(4) is optically coupled to the second detector 219G(4) of the fourth detector pair.

The embodiments of FIGS. 3 and 4 are also examples of a class of embodiments that each comprise a second wavelength division multiplexer (341G in FIG. 3, 441G in FIG. 4); and a first set of optical detectors (319G(1)-319G(4) in FIG. 3, 419G(1)-419G(4) in FIG. 4) where each optical detector of the first set of optical detectors is optically coupled to the second wavelength division multiplexer (341G in FIG. 3, 441G in FIG. 4). The embodiments of FIGS. 3 and 4 are also examples of a class of embodiments where each embodiment in the class comprises a third wavelength division multiplexer (341F in FIG. 3, 441F in FIG. 4); and a second set of optical detectors (319F(1)-319F(4) in FIG. 3, 419F(1)-419F(4) in FIG. 4) where each optical detector of the second set of optical detectors is optically coupled to the third wavelength division multiplexer (341G in FIG. 3, 441G in FIG. 4). The embodiments of FIGS. 3 and 4 are also examples of a class of embodiments where each embodiment of the class comprises an optical coupler (305 in FIG. 3,. 405 in FIG. 4) that is optically coupled to the second wavelength division multiplexer (341G in FIG. 3, 441G in FIG. 4) and the third wavelength division multiplexer (341F in FIG. 3, 441F in FIG. 4).

The embodiment of FIG. 3 is also an example of a class of embodiments where each embodiment of the class comprises a fourth wavelength division multiplexer 341A, and a delay coil 306. It is also an example of a class of embodiments where: (a) the delay coil 306 is optically coupled between the fourth wavelength division multiplexer 341A and the optical coupler 305; (b) the first wavelength division multiplexer 341C is optically coupled to the optical coupler 305; (c) the fourth wavelength division multiplexer 341A is optically coupled to a first end of each of the plurality of sensor array ladders 331(1)-331(4); (d) the first wavelength division multiplexer 341C is optically coupled to a second end of each of the plurality of sensor array ladders 331(1)-331(4); and (e) each of the plurality of non-overlapping signals is delivered to a separate sensor array ladder of the plurality of sensor array ladders 331(1)-331(4).

The embodiment of FIG. 4 is also an example of a class of embodiments where each embodiment of the class comprises a delay coil 406; a first set of add/drop modules 432A(1)-432A(4); and a second set of add/drop modules 432C(1)-432C(4). It is also an example of a class of embodiments where: (a) each add/drop module of the first set of add/drop modules 432A(1)-432A(4) is optically coupled to a first end of a sensor array ladder (431(1), 431(2), 431(3), or 431(4)); (b) each add/drop module of the second set of add/drop modules 432C(1)-432C(4) is coupled to a second end of a sensor array ladder (431(1), 431(2), 431(3), or 431(4)); (c) the delay coil 406 is optically coupled between the first set of add/drop modules 432A(1)432A(4) and the optical coupler 405; and (d) the second set of add/drop modules 432C(1)-432C(4) is optically coupled to the optical coupler 405.

The embodiment of FIG. 4 is also an example of a class of embodiments where each embodiment of the class comprises a fourth wavelength division multiplexer 441I where both the first (441H) and fourth (441I) wavelength division multiplexers are optically coupled between the broadband source 403 and the optical coupler 405 with the first wavelength division multiplexer 441H splitting a broadband signal from the source 403 into a plurality of narrower non-overlapping signals, and the fourth wavelength division multiplexer 441I combining the plurality of narrower non-overlapping signals back into a single signal. The embodiment of FIG. 4 is also an example of a class of embodiments where each embodiment of the class includes an optical isolator 442 that is positioned between the fourth wavelength division multiplexer 441I and the optical coupler 405.

Figure 5:
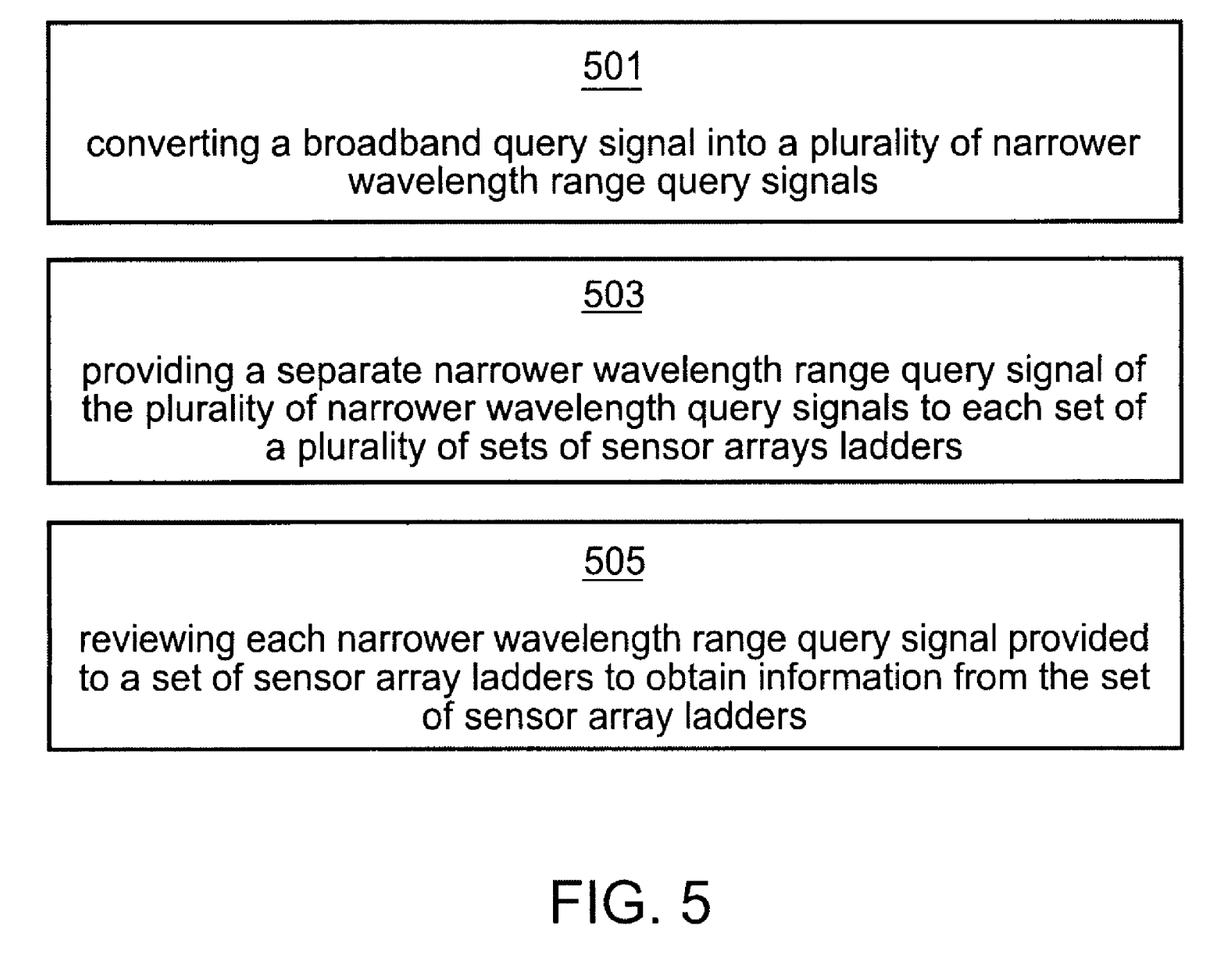
FIG. 5 illustrates a method in accordance with an exemplary embodiment of the invention.

The embodiments of FIGS. 2-4 are also examples of a class of embodiments where each embodiment of the class incorporates a method of obtaining information from a plurality of sensor array ladders comprising: (a) converting a broadband query signal into a plurality of narrower wavelength range query signals; (b) providing a separate narrower wavelength range query signal of the plurality of narrower wavelength query signals to each set of a plurality of sets of sensor arrays ladders; and (c) reviewing each narrower wavelength range query signal provided to a set of sensor array ladders to obtain information from the set of sensor array ladders. This method is illustrated in FIG. 5 with steps 501, 503, and 505.

The embodiments of FIGS. 3 and 4 also examples of a class of embodiments where: (a) each embodiment of the class incorporates a method wherein the broadband query signal is divided into a clockwise signal and a counter-clockwise signal before each of the clockwise and counter-clockwise signals is converted into a plurality of narrower wavelength range query signals; and (b) each embodiment of the class incorporates a method wherein a delay coil is used to delay either the clockwise signal or the counter clockwise signal before it is converted into a plurality of narrower wavelength range signals.

The embodiment of FIG. 3 is also an example of a class of embodiments where each embodiment of the class incorporates a method wherein a first wavelength division multiplexer is used to simultaneously divide the clockwise signal into a plurality of narrower wavelength range query signals, and a second wavelength division multiplexer is used to simultaneously divide the counter-clockwise signal into a plurality of a plurality of narrower wavelength range query signals. The embodiment of FIG. 4 is also an example of a class of embodiments where each embodiment of the class incorporates a method wherein a first set of serially arranged add/drop modules is used to divide the clockwise signal into a plurality of narrower wavelength range query signals, and a second set of serially arranged add/drop modules is used to divide the counter-clockwise signal into a plurality of narrower wavelength range query signals.

What is claimed is:

1. A sensor array system comprising:
   a signal source providing a query signal;
   a plurality of sensor array ladders, each sensor array ladder having a plurality of sensors connected in parallel;
   an optical coupler coupled to the signal source;
   a first wavelength division multiplexer coupled to the optical coupler and to a first end of each of the plurality of sensor array ladders, the first wavelength division multiplexer receiving the query signals from the signal source and splitting the query signal into a plurality of non-overlapping signals that are each narrower than the initial query signal;
   a second wavelength division multiplexer coupled to the optical coupler;
   a first set of optical detectors, each optical detector of the first set being coupled to the second wavelength division multiplexer;
   a third wavelength division multiplexer coupled to the optical coupler;
   a second set of optical detectors, each optical detector of the second set being coupled to the third wavelength division multiplexer;
   a fourth wavelength division multiplexer coupled to a second end of each of the plurality of sensor array ladders; and
   an optical delay coupled between the fourth wavelength division multiplexer and the optical coupler.

2. The apparatus of claim 1 wherein the signal source comprises a broadband source.

3. The apparatus of claim 2 wherein:
   the signal source is a multi-wavelength source;
   the provided query signal comprises a plurality of frequency separated frequency slices; and
   a different frequency slice is routed to each of the plurality of sensor array ladders.

4. The system of claim 3 wherein at least one sensor array ladder of the plurality of sensor array ladders is a Sagnac sensor array ladder.

5. The system of claim 4 wherein all of the sensor array ladders of the plurality of sensor array ladders are Sagnac sensor array ladders.

6. The system of claim 1 wherein the first wavelength division multiplexer is a first set of add/drop modules; and the fourth division multiplexer is a second set of add/drop modules, each add/drop module of the first set of add/drop modules optically coupled to a first end of a sensor array ladder; and each add/drop module of the second set of add/drop modules coupled to a second end of a sensor array ladder.

7. The system of claim 6 wherein both the second and third wavelength division multiplexers are optically coupled between the signal source and the optical coupler with the second wavelength division multiplexer splitting a signal from the signal source into a plurality of narrower non-overlapping signals, and the third wavelength division multiplexer combining the plurality of narrower non-overlapping signals into a single signal.

8. The system of claim 7 wherein an optical amplifier is positioned between the third wavelength division multiplexer and the optical coupler.

9. A sensor array system comprising:
a signal source providing a query signal;
a plurality of Sagnac sensor array ladders;
a mechanism for routing a first frequency slice of the query signal to a first array of the plurality of sensor arrays, and routing a second frequency slice of the query signal to a second array of the plurality of sensor arrays, wherein
the first and second frequency slices are frequency separated;
a wavelength division multiplexer optically coupled between the signal source and the plurality of sensor array ladders, wherein
the wavelength division multiplexer receives the query signal from the signal source, and splits the query signal into a plurality of non-overlapping signals that are each narrower than the initial query signal, the plurality of non-overlapping signals including the first and the second frequency slice;
each of the plurality of non-overlapping signals being delivered to a separate sensor array ladder of the plurality of sensor array ladders;
a plurality of optical couplers; and
a plurality of optical detector pairs, wherein
each optical coupler of the plurality of optical couplers is optically coupled to both sides of the Sagnac sensor array ladder, and is optically coupled to both optical detectors of one pair of optical detectors of the plurality of optical detector pairs.

10. The system of claim 9 wherein:
the plurality of optical couplers comprises at least a first optical coupler, a second optical coupler, a third optical coupler, and a fourth optical coupler, and each optical coupler comprises at least six ports;
the plurality of Sagnac sensor array ladders comprises at least a first sensor array ladder, a second sensor array ladder, a third sensor array ladder, and a fourth sensor array ladder;
the plurality of optical detector pairs comprises at least a first detector pair, a second detector pair, a third detector pair, and a fourth detector pair, and each of the first, second, third, and fourth detector pairs comprises a first detector and a second detector;
the system furthers comprises at least a first delay coil, a second delay coil, a third delay coil, and a fourth delay coil;
a first port of the first optical coupler is optically coupled to a first port of the wavelength division multiplexer, a first port of the second optical coupler is optically coupled to a second port of the wavelength division multiplexer, a first port of the third optical coupler is optically coupled to a third port of the wavelength division multiplexer, a first port of the fourth optical coupler is optically coupled to a fourth port of the wavelength division multiplexer, and the optical source is optically coupled to a fifth port of the wavelength division multiplexer;

a second port of the first optical coupler is optically coupled to a first end of the first delay coil, a second port of the second optical coupler is optically coupled to a first end of the second delay coil, a second port of the third optical coupler is optically coupled to a first end of the third delay coil, and a second port of the fourth optical coupler is optically coupled to a first end of the fourth delay coil;

a second end of the first delay coil is optically coupled to a first end of the first sensor array ladder, a second end of the second delay coil is optically coupled to a first end of the second sensor array ladder, a second end of the third delay coil is optically coupled to a first end of the third sensor array ladder, and a second end of the fourth delay coil is optically coupled to a first end of the fourth sensor array ladder;

a fourth port of the first optical coupler is optically coupled to a second end of the first sensor array ladder, a fourth port of the second optical coupler is optically coupled to a second end of the second sensor array ladder, a fourth port of the third optical coupler is optically coupled to a second end of the third sensor array ladder, and a fourth port of the fourth optical coupler is optically coupled to a second end of the fourth sensor array ladder; and a fifth port of the first optical coupler is optically coupled to the first detector of the first detector pair and a sixth port of the first optical coupler is optically coupled to the second detector of the first detector pair, a fifth port of the second optical coupler is optically coupled to the first detector of the second detector pair and a sixth port of the second optical coupler is optically coupled to the second detector of the second detector pair, a fifth port of the third optical coupler is optically coupled to the first detector of the third detector pair and a sixth port of the third optical coupler is optically coupled to the second detector of the third detector pair, and a fifth port of the fourth optical coupler is optically coupled to the first detector of the fourth detector pair and a sixth port of the fourth optical coupler is optically coupled to the second detector of the fourth detector pair.

11. A method of obtaining information from a plurality of sensor array ladders, wherein each of the plurality of sensor array ladders comprises a plurality of sensors arranged in parallel, the steps of the method comprising:
dividing a broadband query signal into a clockwise signal and a counter-clockwise signal;
converting each of the clockwise and counter-clockwise signals into a plurality of narrower wavelength range query signals;
providing a separate narrower wavelength range query signal of the plurality of narrower wavelength query signals to each set of a plurality of sets of sensor array ladders; and reviewing each narrower wavelength range query signal provided to a set of sensor array ladders to obtain information from the set of sensor array ladders.

12. The method of claim 11 wherein a delay coil is used to delay either the clockwise signal or the counter clockwise signal before it is converted into a plurality of narrower wavelength range signals.

13. The method of claim 12 wherein a first wavelength division multiplexer is used to simultaneously divide the clockwise signal into a plurality of narrower wavelength range query signals, and a second wavelength division multiplexer is used to simultaneously divide the counter-clockwise signal into a plurality of narrower wavelength range query signals.

14. The method of claim 13 wherein a first set of serially arranged add/drop modules is used to divide the clockwise signal into a plurality of narrower wavelength range query signals, and a second set of serially arranged add/drop modules is used to divide the counter-clockwise signal into a plurality of narrower wavelength range query signals.

* * * * *